United States Patent Office 3,743,713
Patented July 3, 1973

3,743,713
PREPARATION OF RADIOACTIVE MONO AND
DI-IODOSULFOBROMOPHTHALEIN
Sadatake Kato, Tokyo, and Kunio Kurata, Matsudo,
Japan, assignors to Dainabot Radioisotope Laboratories Ltd., Tokyo, Japan
Filed June 22, 1971, Ser. No. 155,546
Int. Cl. A61k 27/04
U.S. Cl. 424—1                                3 Claims

ABSTRACT OF THE DISCLOSURE

A method of preparing radioactive mono and di-iodosulfobromophthalein for clinical purposes and wherein the ratio of di to monoiodosufobromophthalein can be controlled is disclosed. No separation and purification of the compounds is required for their use in clinical diagnostic procedures. The compounds, particularly the monoiodo compound, offer a number of advantages in comparison to sulfobromophthalein when used for biological investigation.

BACKGROUND OF THE INVENTION

Certain tests of hepatic function are based on the ability of the polygonal cells to remove specific types of dyes from the blood and to excrete these via the biliary tract. Sulfo bromophthalein (BSP) has been widely used for this purpose. In this procedure, the concentration of the dye in the blood is measured by colorimetric methods.

In 1961, Tubis et al. (J. of Nuclear Medicine, vol. 2, p. 282, 1961) developed a method of using radioiodinated BSP for the same clinical purpose. This has several advantages over the old method using non-radioactive materials, namely;

(1) By labeling the dye with $^{131}$I, the rate of organ uptake, bood disappearance, excretion and the distribution of the dye can be measured externally.

(2) The radioactivity of the dye permits the administration of very small quantities to the patient, thereby avoiding occasional toxicity which was reported with the former method.

(3) It also obviates the difficulties of colorimetric measurement of blood samples from patients afflicted with jaundice.

(4) The measurement of radioactivity of a bood sample withdrawn from a patient gives more accurate results than the colorimetric method.

SUMMARY OF THE INVENTION

By employing a mixture of KI and KIO$_3$ in HCl to produce iodine mono chloride and by varying the ratio of iodine to sulfobromophthalein (BSP); the amount of mono and di-iodo sulfobromophthalein produced can be controlled. No separation and purification of the compounds is required for their use in clinical diagnostic procedures. Pure di-iodo BSP can be obtained by using two moles of iodine to one mole of BSP. By using less than two moles of iodine to one mole of BSP, a mixture of monoiodo BSP and di-ido BSP results. Using less than 0.2 mole of iodine to one mole of BSP results in essentially no di-iodo BSP being produced.

DRAWINGS

The invention will be better understood with reference to the following drawings in which.

DETAILED DESCRIPTION

Tubis et al. described two different methods for synthesis of the $^{131}$I-BSP, as follows:

(1) To 1 ml. of 1:9 HCl:H$_2$O; 81 mg. of iodine monochloride solution was added at 80° C. and thoroughly mixed. To the mixture, 20 mCi. (millicurie) of Na$^{131}$I was added and mixed and the temperature was lowered to 65° C. To this solution, 210 mg. BSP sodium in 1 ml. H$_2$O and 0.6 ml. of 0.1 N NaOH were mixed and the mixture allowed to stand for 2 hours at 65° C. After this period, the mixture was evaporated to dryness and redissolved with 1 ml. H$_2$O plus 1 ml. N NaOH. The residue was added to ice cold acetone to form a precipitate which was separated by centrifugation. It was presumed that in the BSP$^{131}$I produced, the iodine was positioned in the phenolic rings ortho to the hydroxyl groups.

(2) About 20 mCi. $^{131}$I was released from Na$^{131}$I solution by adding KI, NaNO$_2$ and HCl, and the iodine was shaken out with cold CCl$_4$. The shakeout was extracted with NaOH solution. The extracted Na$^{131}$I was added to 210 mg. BSP dissolved in 1 ml. H$_2$O plus 0.6 ml. 0.1 M NaOH. The mixture was heated to 70–75° C. for 1 hour and was evaporated to dryness and recrystallized as with the previous method.

In this method, it was presumed that an exchange reaction takes place between iodine and some of the bromine atoms in the tetrabromophthalic moiety.

Figure 1:
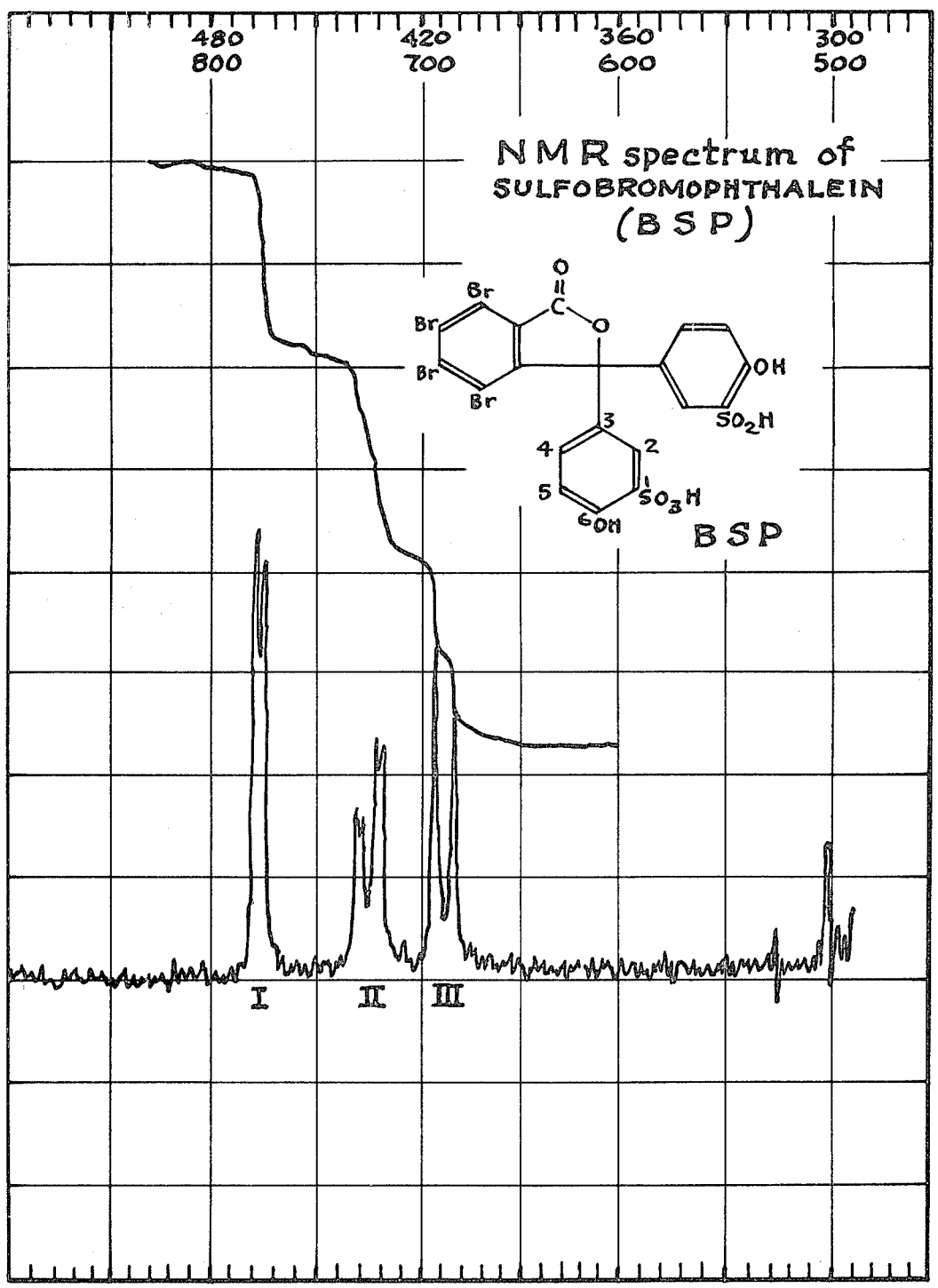
FIG. 1 is the nuclear magnetic resonance (NMR) spectrum for sulfobromophthalein.
Figure 2:
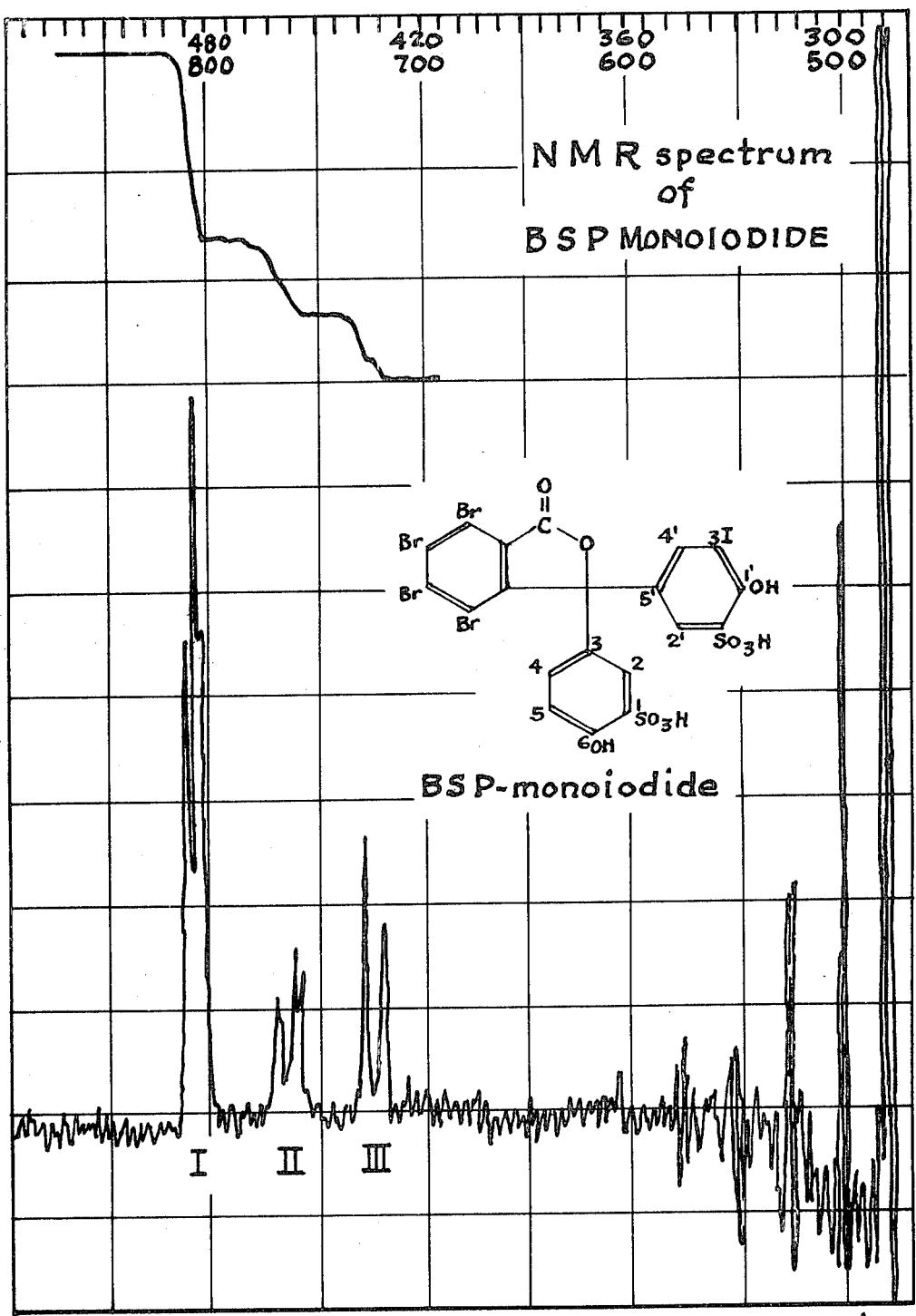
FIG. 2 is the NMR spectrum for mono-iodosulfobromophthalein.
Figure 3:
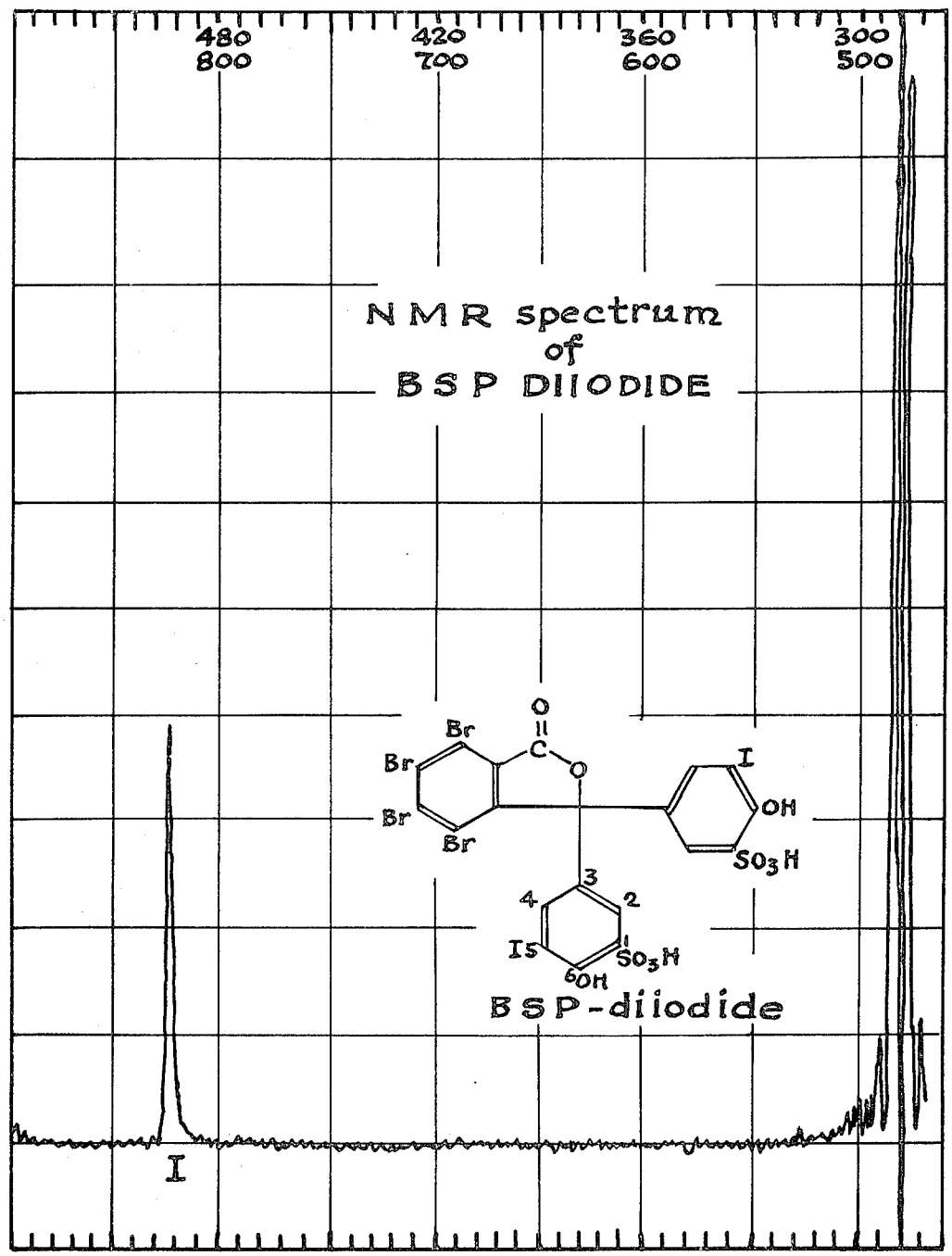
FIG. 3 is the NMR spectrum for di-iodosulfobromophthalein.

A thin layer chromatogram was performed with the substance obtained with the first method, using a mixture of n-butyl alcohol:acetic acid:H$_2$O (74:18.5:50) as a developing solvent. Three different spots were recognized and the substances were separated from each spot. By the results of chemical quantitative analysis and nuclear magnetic resonance (NMR) spectrum (FIGS. 1, 2 and 3), one was identified as BSP itself, the second as mono-iodo-BSP and third as di-iodo-BSP, where, in both iodinated derivatives, iodine atoms were in the phenolic rings ortho to the hydroxyl groups.

By using excess iodine over BSP, M. Jirsa and P. Hykes (Nature, No. 5049, pp. 645–6, 1966) synthesized iodinated BSP and estimated its chemical structure as the di-iodo-BSP from its iodine content.

Investigation of the methods to synthesize pure mono-iodo-BSP and pure di-iodo-BSP by a modification of the first described method resulted in the following.

In the method, iodine mono chloride can be replaced with a mixture of KI, KIO$_3$ and HCl, since the three chemicals can produce iodine mono chloride by the following reaction in aqueous solution.

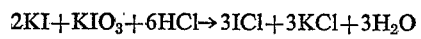

$$2KI + KIO_3 + 6HCl \rightarrow 3ICl + 3KCl + 3H_2O$$

As iodine mono chloride is known to be rather unstable, the mixture was used in the hereinafter described studies.

To a known amount of BSP-Na$_2$ in water, a known amount of KI/KIO$_3$ (2/1 mole ratio) in 3 N HCl solution containing a tracer amount of radioactive iodine-131 was added at room temperature and allowed to stand for 24 hours. Three radioactive spots were detected on the thin layer chromatogram of the reaction mixture and they were identified as BSP, mono-iodo-BSP and di-iodo-BSP. From the ratio of radioactivity of the three spots and the amounts of BSP and total iodine used for the reaction, the amounts of BSP, mono-iodo-BSP, and di-iodo-BSP were calculated. The results are shown in FIG. 4.

Figure 4:
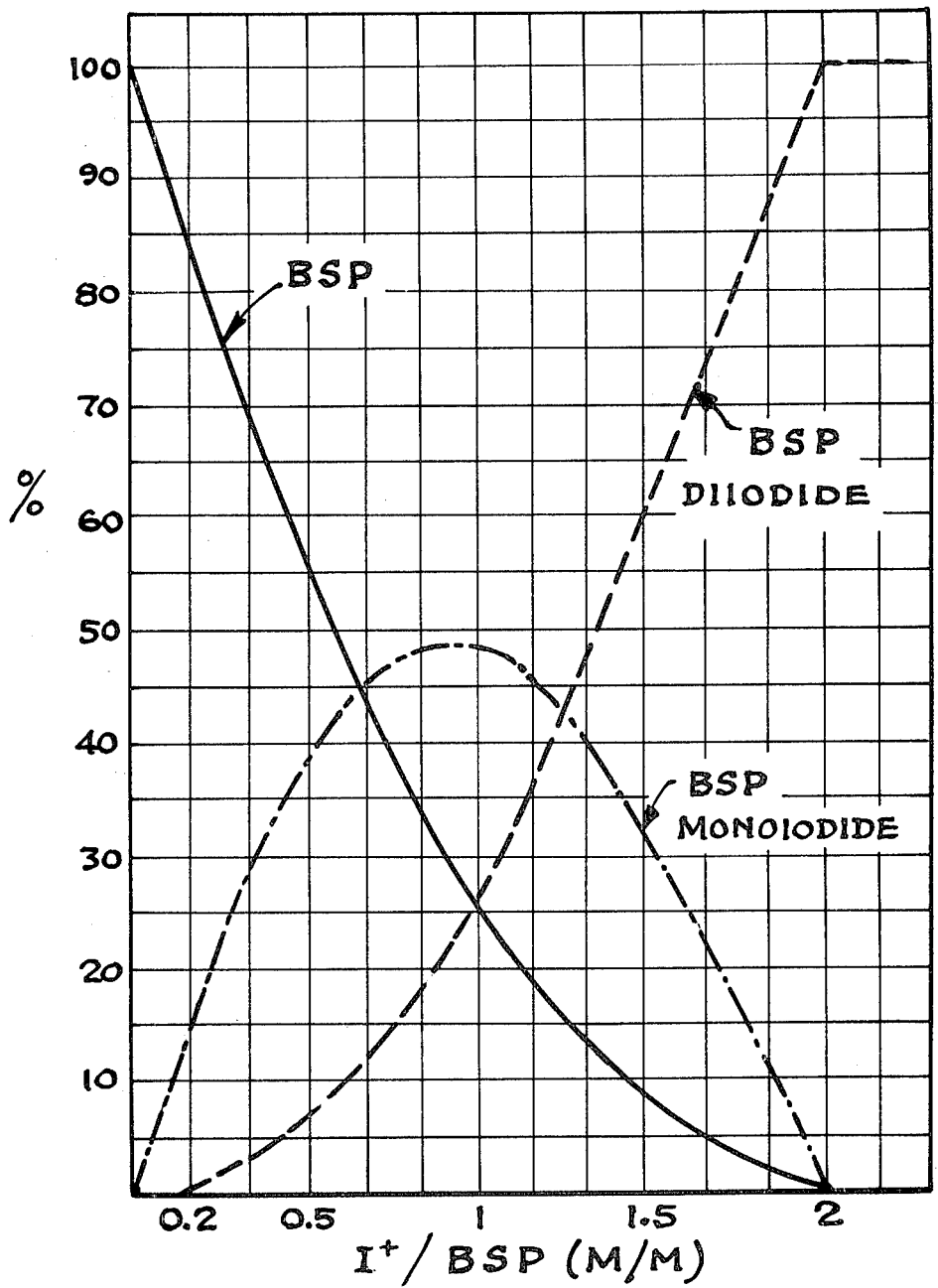
FIG. 4 represents the concentration of sulfobromophthalein and its mono and di-iodo derivatives as a function of the ratio of iodine and sulfobromophthalein used in the reaction mixture.

It is clearly shown in FIG. 4 that pure di-iodo-BSP can be obtained by using 2 moles of iodine to 1 mole of BSP. However, by using less than 2 moles of iodine to 1 mole of BSP, a mixture of BSP, mono-iodo-BSP and di-iodo-BSP is obtained because a BSP molecule has two sites where iodine atoms can combine with almost the same degree of affinity. Therefore, theoretically, mono-iodo-BSP alone cannot be produced without any separation and purification from the mixture. As a radiopharmaceutical, however, BSP itself is not of concern because it has no radioactivity and only the radioactivity of blood samples or organs is measured for diagnostic purposes. On the other hand, by using smaller amounts of chemically reactive iodine, the di-/mono-iodo-BSP ratio can be decreased to any theoretical ratio. The results presented in FIG. 4 show that the di-iodo-BSP cannot be practically detected when less than 0.2 mole of iodine to 1 mole of BSP is used. Therefore, the described method can be applied to the production of radioactive mono-iodo-BSP for clinical use, without any chemical purification after the reaction.

A number of biological investigations were conducted with animals and human beings using radioactive mono-iodo-BSP and di-iodo-BSP synthesized in accordance with the described method, and the results obtained were compared to each other and with BSP. As a result of these studies, it was found that the three compounds had different biological behavior. For example, the mono-iodo-BSP was cleared more rapidly from the blood of dogs than the di-iodo-BSP and appeared quicker in their biles, after intravenous injection. The human blood clearance rates of iodinated BSP compounds were significantly slower than that of BSP. It was also demonstrated that some parts of BSP administered intravenously to dogs were conjugated at the liver, while both of the iodinated compounds were not conjugated.

Radioiodinated BSP can be used for liver function studies by externally measuring its distribution in organs and studying the changes of the radioactivity thereof, or by measuring the radioactivity of blood samples from patients. In the latter case, the following figure is calculated and used as a parameter which reflects the liver function.

$$X = \frac{\text{Radioactivity in blood}}{\text{Total radioactivity administered to the patient}}$$

The blood radioactivity can be calculated as: (total blood volume of the patient) × (radioactivity per unit volume of sample blood). The blood radioactivity after some ten minutes is a portion of its initial concentration. Therefore, the value can be calculated by comparing a blood sample radioactivity with a standard solution, which is prepared by quantitative dilution of the injected dose.

To simplify the procedure, all the necessary apparatus can be assembled in a kit which permits a rapid, simple diagnosis of liver function. A suitable kit contains the following:

(a) 10 disposable syringes (or cartridges) each containing 0.5 ml. of sterile radioiodinated BSP solution and permitting quantitative delivery of the contents into the body.

(b) 10 needles for the syringes.

(c) A standard test tube containing 1 ml. of diluted radioiodinated BSP solution, which is prepared by diluting the solution in paragraph (a) to 1:1000.

(d) 10 test tubes of the same type and size as paragraph (c), but empty.

(e) 10 heparinized tubes.

The knit is used as follows:

(1) Inject intravenously radioiodinated BSP (a) into patient.

(2) Withdraw about 2 ml. of blood sample from the patient into the test tube (e), 30 minutes after injection.

(3) Transfer exactly 1 ml. of the blood from tube (e) to tube (d).

(4) Count the radioactivity of the blood sample (3).

(5) Count the radioactivity of the standard solution (a).

(6) Calculate the X value by the following formula:

$$\frac{\text{Blood c.p.m. per ml.} \times \text{body weight} \times 0.072}{\text{Standard c.p.m.} \times 1000}$$

The normal X value is less than 3%, while, in the patients with liver diseases, this value is 3 to 50% or more.

What is claimed is:

1. In a method for producing radioactive mono and di-iodosulfobromophthalein for clinical purposes without the need for separation and purification and wherein the ratio of di-iodo to mono-iodosulfobromophthalein can be controlled, said method comprising:

adding to sodium sulfobromophthalein a solution of potassium iodide and potassium iodate in hydrochloric acid and containing a tracer amount of iodine $^{131}$I; and varying the molar ratio of iodine to sulfobromophthalein from less than 0.2 and from at least 2 to obtain from essentially all mono-iodosulfobromophthalein to all di-iodosulfobromophthalein, respectively.

2. The method of claim 1 wherein the molar ratio of iodine to sulfobromophthalein is at least 2 to thereby obtain di-iodosulfobromophthalein.

3. The method of claim 1 wherein the molar ratio of iodine to sulfobromophthalein is less than 0.2 to thereby obtain mono-iodosulfobromophthalein.

References Cited

Suwanik et al., Int. J. Appl. Radiat. Isotop., vol. 19, p. 883 (1968).

LELAND A. SEBASTIAN, Primary Examiner

U.S. Cl. X.R.

260—343.4